United States Patent

Tate et al.

[11] Patent Number: 5,577,363
[45] Date of Patent: Nov. 26, 1996

[54] STRUCTURAL PANEL

[75] Inventors: James R. Tate, Watertown, Wis.; Allen E. Lee, Brookings, S. Dak.; Bryan P. Zacher, Brookings, S. Dak.; Vernon D. Olson, Brookings, S. Dak.

[73] Assignee: Menasha Corporation, Neenah, Wis.

[21] Appl. No.: 392,574

[22] Filed: Feb. 23, 1995

[51] Int. Cl.[6] .............................. E04C 2/34; E06B 7/16
[52] U.S. Cl. ........................ 52/784.15; 52/309.11; 52/588.1; 52/800.1; 52/802.1
[58] Field of Search .................. 52/309.11, 800.1, 52/802.1, 784.15, 588.1, 455

[56] References Cited

U.S. PATENT DOCUMENTS

| | | | |
|---|---|---|---|
| 2,042,721 | 6/1936 | Loewy | 52/802.1 X |
| 2,376,653 | 5/1945 | Boyer | 52/309.11 X |
| 3,235,040 | 2/1966 | Ellis | 52/1 |
| 3,334,464 | 8/1967 | Charles | 52/620 |
| 3,359,699 | 12/1967 | Jackson | 52/619 |
| 3,885,351 | 5/1975 | Imperial et al. | 52/802.1 X |
| 3,987,588 | 10/1976 | Imperial et al. | 52/802.1 X |
| 4,161,567 | 7/1979 | Sturgeon | 428/594 |
| 4,281,493 | 8/1981 | Pitt | 52/309.11 |
| 4,374,693 | 2/1983 | Pitt | 52/309.11 X |
| 4,409,768 | 10/1983 | Boden | 52/309.4 |
| 4,546,585 | 10/1985 | Governale | 52/309.11 |
| 4,550,540 | 11/1985 | Thorn | 52/309.4 |
| 4,580,380 | 4/1986 | Ballard | 52/309.9 |
| 4,748,781 | 6/1988 | Wencley | 52/309.5 |
| 4,864,789 | 9/1989 | Thorn | 52/309.9 |
| 4,922,674 | 5/1990 | Thorn | 52/309.11 X |
| 4,941,304 | 7/1990 | Lewellin | 52/580 |
| 5,077,948 | 1/1992 | Olson et al. | 52/309.11 X |
| 5,142,835 | 9/1992 | Mrocca | 52/309.11 X |
| 5,161,346 | 11/1992 | Olson et al. | 52/309.11 X |

FOREIGN PATENT DOCUMENTS

| | | | |
|---|---|---|---|
| 2065955 | 10/1993 | Canada | 52/784.15 |
| 512433 | of 1939 | United Kingdom | 52/455 |

*Primary Examiner*—Wynn E. Wood
*Assistant Examiner*—Yvonne Horton-Richardson
*Attorney, Agent, or Firm*—Quarles & Brady

[57] ABSTRACT

A door or other structural panel of the type which has a pair of opposed, congruent sheets spaced apart by a frame to define a separation space between the sheets which may be filled with a core, such as foam. The edge of each sheet has a zig-zag portion which defines a ledge on the outer side of the sheet and a ridge on the inner side of the sheet. The frame member between the sheets at each edge has on each of two sides a projecting flange and a projecting hook which interlock with the zig-zag portion of the sheets to create a mechanical engagement between the sheets and the frame member. The flow of liquid foam into the separation space is controlled by a rib projecting inwardly from the sheet and by a resilient foam block slightly compressed between the sheets. Methods of manufacturing such panels are provided, including by sliding the beams onto the sheet edges and tapping the beams into a rigid state, and by employing temporary frame members which can be removed and re-used after the foam hardens.

7 Claims, 4 Drawing Sheets

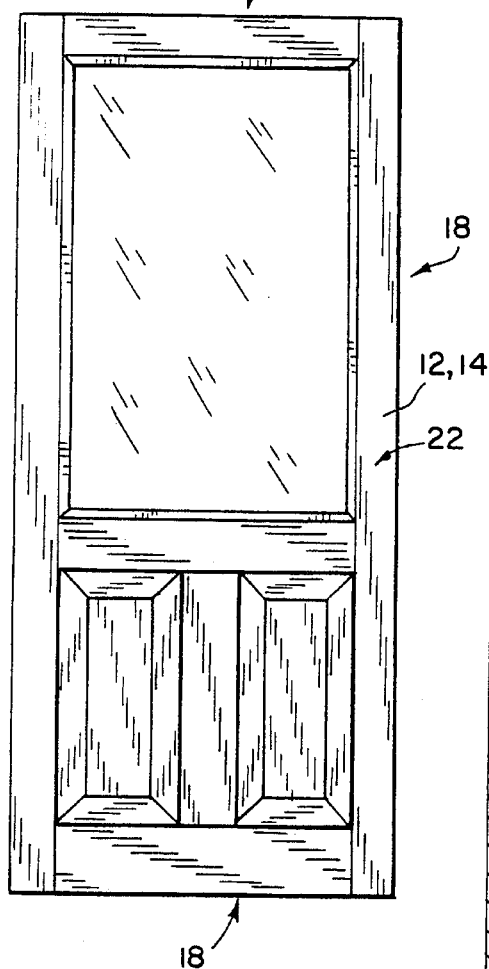
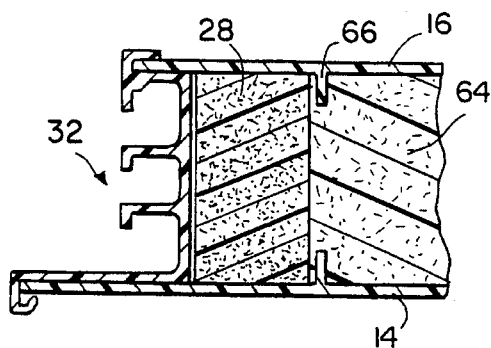
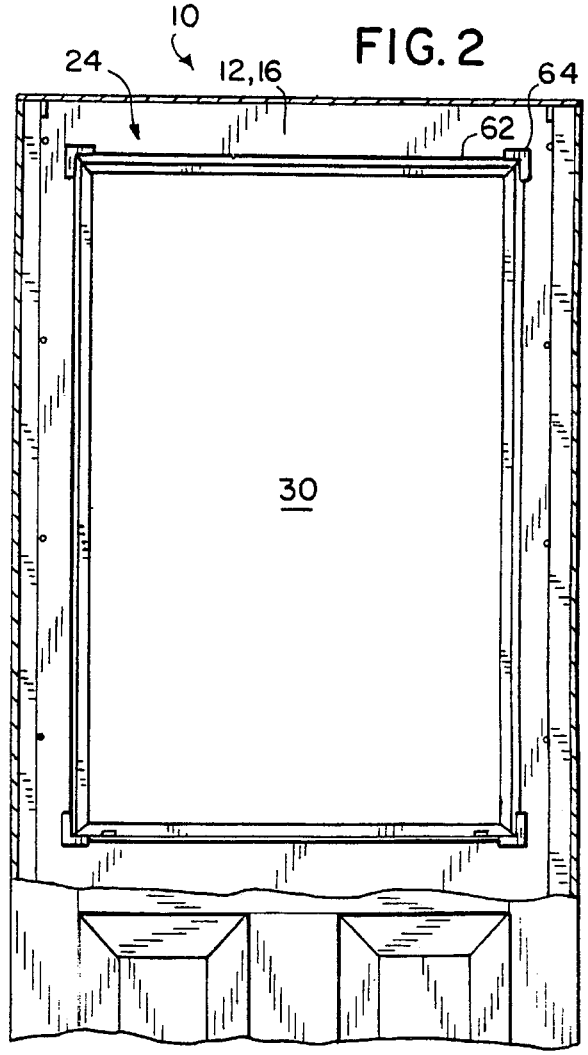
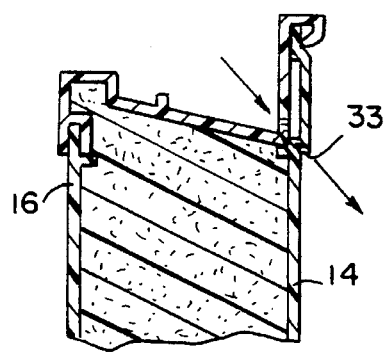

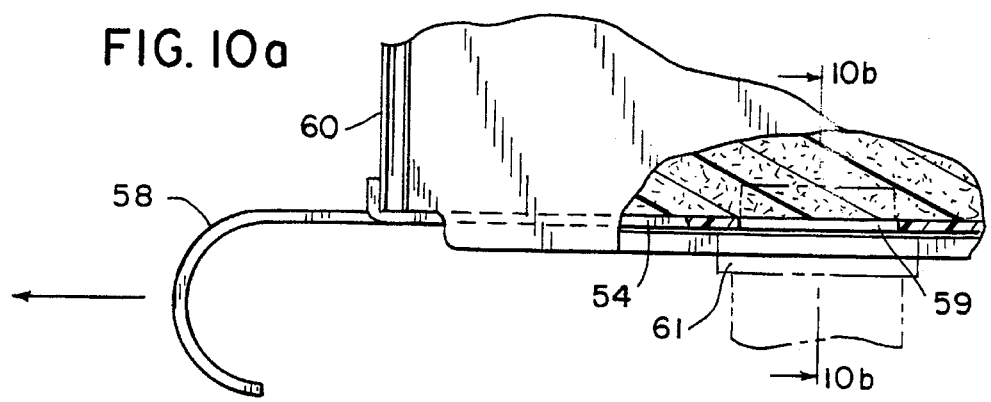
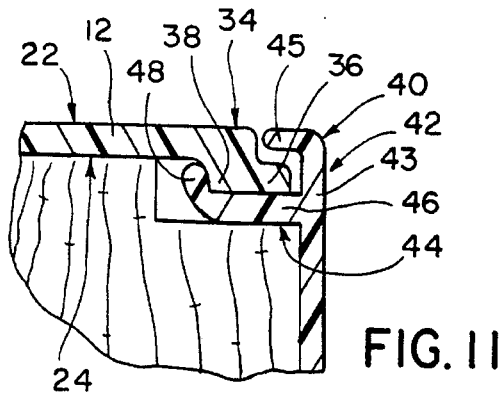
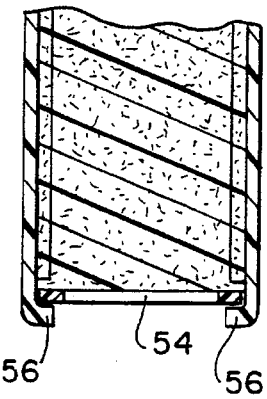
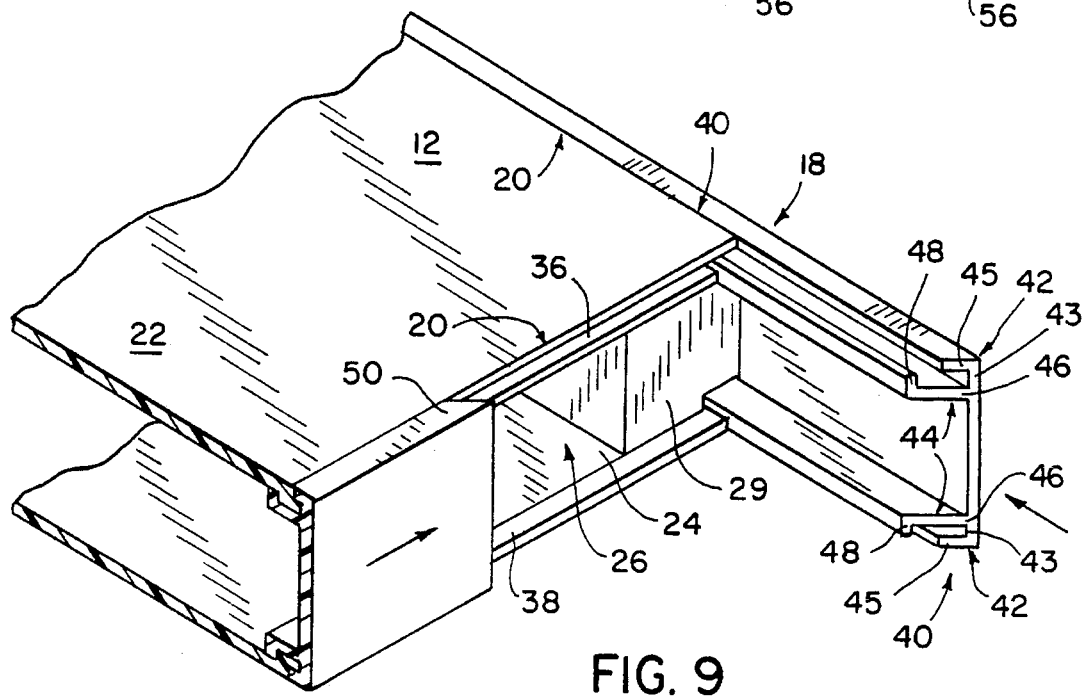

STRUCTURAL PANEL

BACKGROUND OF THE INVENTION

The invention relates to doors and other structural panels formed from two sheets separated by a frame, sometimes with a foam or other core between the sheets.

Examples of doors made in this way may be found in U.S. Pat. No. 4,550,540 and 4,864,789 issued to Thorn. In some previous designs, the sheets have been glued to a frame, which forms the edges of the panel. See especially U.S. Pat. No. 4,864,789. Gluing the sheets to the frame members is a relatively costly manufacturing operation. There is therefore a need for a sandwich-type panel which can be assembled simply and without gluing the sheets to the frame members.

In some cases, the space between the sheets is filled with foam in a liquid state, which then hardens into a solid foam core. In storm doors, which have an opening for a window, it has been found that the liquid foam tends to leak into the window frame area, which necessitates clean up work, which increases manufacturing costs. There is therefore a need to control the flow of the foam in order to minimize such leakage.

In some uses, the solid foam core can provide sufficient structural integrity so that framing members would not be needed on all sides, except for the need to provide an enclosed chamber into which to introduce the liquid foam. There is a need for a way to introduce the foam without using unnecessary framing members which add weight and cost.

SUMMARY OF THE INVENTION

The present invention is directed to a door or other structural panel that satisfies these needs.

The invention provides a structural panel which comprises a pair of opposed, congruent sheets which are spaced apart by a frame to form a separation space between them. The frame includes a beam located longitudinally along an edge of each of the sheets. Each sheet has an outer side and an inner side facing the inner side of the other sheet. The edge of each of the sheets has an inwardly projecting zig-zag which defines a ledge on the outer side of the sheet and a ridge on the inner side of the sheet. Along a longitudinal edge of the beam a flange extends from the beam. The flange has a connected leg which is an extension of the beam and is outward of the ledge. The flange also has a free leg overlying the ledge. Spaced apart from the flange, a hook projects from the beam into the separation space. The hook includes a post which projects inwardly from the beam inward of the ledge and a cross member which projects outwardly from the post inward of the ridge toward the inner side of the sheet. The sheet and the beam are adapted so that the ledge fits closely between the flange and the hook thereby establishing a mechanical engagement which restrains movement between the edge and the beam in two mutually orthogonal directions.

The invention also provides a structural panel in which the elements of the interlocking structure described above are reversed as between the sheet and the beam.

Further, the invention provides a method of manufacturing a structural panel of the types described in the two preceding paragraphs. The method includes the steps of sliding the beams onto the sheets to engage the interlocking structure. The invention provides a further method which includes providing each beam with mitered ends and applying one or more short, light force impulses to one or more mitered ends until each mitered end is abutted tightly against another mitered end, thereby rendering the beams into a substantially rigid frame for the panel.

The invention provides a further method of manufacturing a foam filled, separated-sheet panel. One or more temporary frame members are provided, the separation space is filled with liquid foam, and the temporary frame members are removed after the foam is hardened.

In a panel of the type in which a pair of opposed, congruent sheets are spaced apart by a peripheral frame and the separation space between them is filled with liquid foam, the invention provides a rib projecting inwardly from the inner side of at least one of the sheets so that the incoming liquid foam encounters a partial barrier which partially retards the flow of the liquid foam in a region of the separation space beyond the barrier. In such a panel, the invention also provides a solid foam block located in the separation space and in contact with the inner sides of both sheets, thereby substantially blocking the flow of the liquid foam in the region of the block.

The objects of the invention are to:

(a) provide a structural panel which can be manufactured more efficiently and at less cost than prior art panels;

(b) to provide a structural panel which can be assembled without gluing the sheets to the edge members;

(c) to control the flow of foam when filling the space between the sheets in order to reduce leakage and thereby to reduce manufacturing costs; and (d) to provide a foam-core structural panel which does not require a frame member on each side.

These and other objects and advantages of the invention will be apparent from the description which follows. The preferred embodiments of the invention will be described in reference to the accompanying drawings. These embodiments do not represent the full scope of the invention, but rather the invention may be employed in other embodiments.

DESCRIPTION OF THE DRAWINGS

FIG. 1 is a front view of a door which embodies the claimed invention.

FIG. 2 is a partial front view of the door of FIG. 1 with the front sheet partially cut away to show part of the inner side of the rear sheet.

FIG. 5 is a cross-sectional view taken on line 5—5 of FIG. 3.

FIG. 6 is a cross-sectional view taken on line 6—6 of FIG. 3 showing details of the window framing and a drain hole.

FIG. 9 is an enlarged perspective view of part of Fig. 8.

FIG. 10(a) is a partial side view illustrating a removable, temporary frame member.

FIG. 10(b) is a cross-sectional view taken on line 10(b)—10(b) of FIG. 10(a).

FIG. 11 is an enlarged view of a portion of FIG. 4 showing the interlocking structure.

DETAILED DESCRIPTION OF THE PREFERRED EMBODIMENTS

Figure 3:
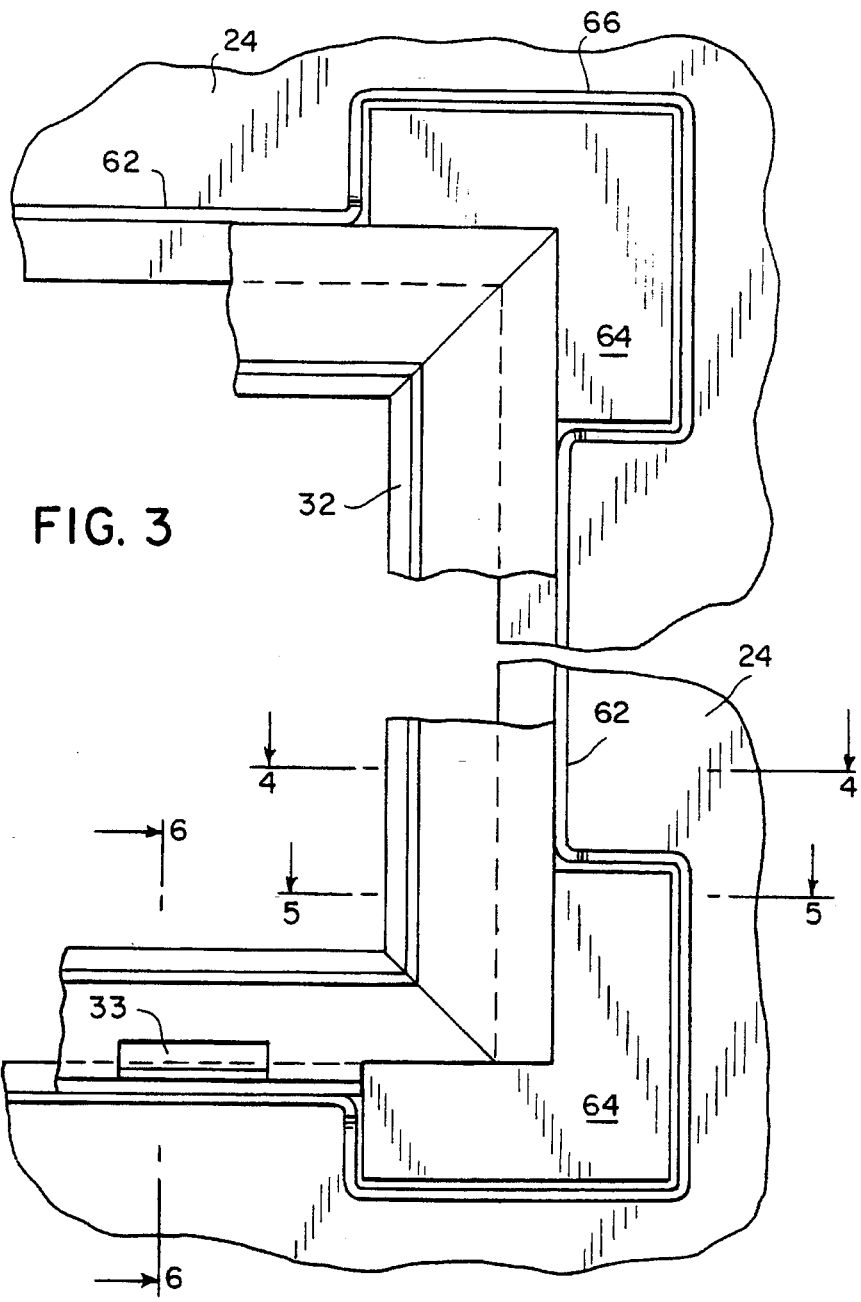
FIG. 3 is an enlarged front view of two corners of the window frame area on the inner side of the rear sheet.

FIG. 1 illustrates the front of a door 10 embodying the present invention. As seen especially in FIG. 4, the door 10 is made up of a pair of opposed, congruent sheets 12 (a front sheet 14 and a rear sheet 16) spaced apart by a frame consisting of beams 18 located along the sheet edges 20. Each sheet 12 has an outer side 22 and an inner side 24, and the inner sides 24 face each other. The sheets 12 and the frame define a separation space 26 in the interior of the door 10. The separation space 26 may be filled with a core, such as a foam core 28. In some applications, wood support member 29 may be employed in the separation space 26, especially adjacent the beams 18.

The door 10 shown in the drawings has a window opening 30 and is provided with a window frame 32 for retaining one or more window panes and/or a screen. A drain hole 33 (FIGS. 3 and 6) may be provided in the bottom of the window frame 32. The invention is not, however, limited to a door with a window, nor even to a door.

Figure 4:
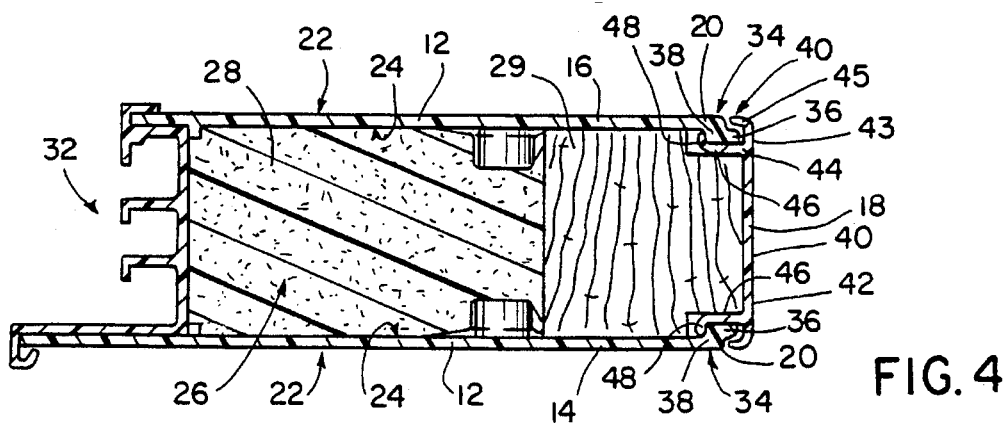
FIG. 4 is a cross-sectional view taken in the plane indicated by line 4—4 of FIG. 3 showing the full cross-section between the window opening and the outer edge of the door and showing a foam-core and wood strip between the sheets of the door.

As shown in FIGS. 4, 9 and 11, the outer edges 20 of each sheet 12 are formed to have an inwardly projecting L-shaped zig-zag portion 34 which defines a ledge 36 at the free end of the "L" on the outer side 22 of the sheet 12, which is parallel with the main plane (or exposed face) of the sheet 12, and a ridge 38 adjacent to the connected end of the "L" on the inner side 24 of the sheet 12 and perpendicular to and extending inwardly from the main plain of the sheet 12.

Each beam 18 which forms part of the frame has two longitudinal beam edges 40 which are formed to mate respectively with the zig-zag portion 34 of the two sheet edges 20. Specifically, as shown in FIGS. 4, 9 and 11, along each of these longitudinal beam edges 40 an L-shaped flange 42 projects from the beam 18 and, spaced apart from the flange 42, an L-shaped hook 44 projects from the beam 18. The flange 42 has its connected leg 43 in the main plane (i.e. the exposed face) of the beam 18, which is perpendicular to the main plane of the sheet 12, and has its free leg 45 extending inwardly from and approximately perpendicular to the connected leg 43 (i.e, approximately parallel to the main plane of the sheet 12). The hook 44 includes a post 46 at its connected end which projects perpendicularly from the beam 18 and a cross member 48 at its free end which projects outwardly from and perpendicular to the post 46.

The beam ends 50 are mitered so that the beams 18 can fit together at right angles.

As shown in FIGS. 4 and 11, when the door 10 has been assembled, the flange 42 and the hook 44 project from the beam 18 toward the separation space 26. The ledge 36 on the sheet edge 20 fits closely between the flange 42 and hook 44, with the free leg 45 overlying and post 46 underlying the ledge 36 to restrain movement in the direction of the thickness of the door, and with the cross member 48 inside of the ridge 38 and the connected leg 43 outside of the ledge 36 to restrain movement in the direction of the width of the door. This establishes a mechanical engagement between the sheet 12 and the beam 18. When a beam 18 has been thus assembled to each pair of opposed sheet edges 20, there is established a rigid frame which is effectively fastened to the sheets 12 without the use of an adhesive.

The connecting structures could be reversed. That is, the beam edges 40 could carry the zig-zag structure and the outer edges 20 of the sheets 12 could carry the flange/hook structure.

Figure 8:
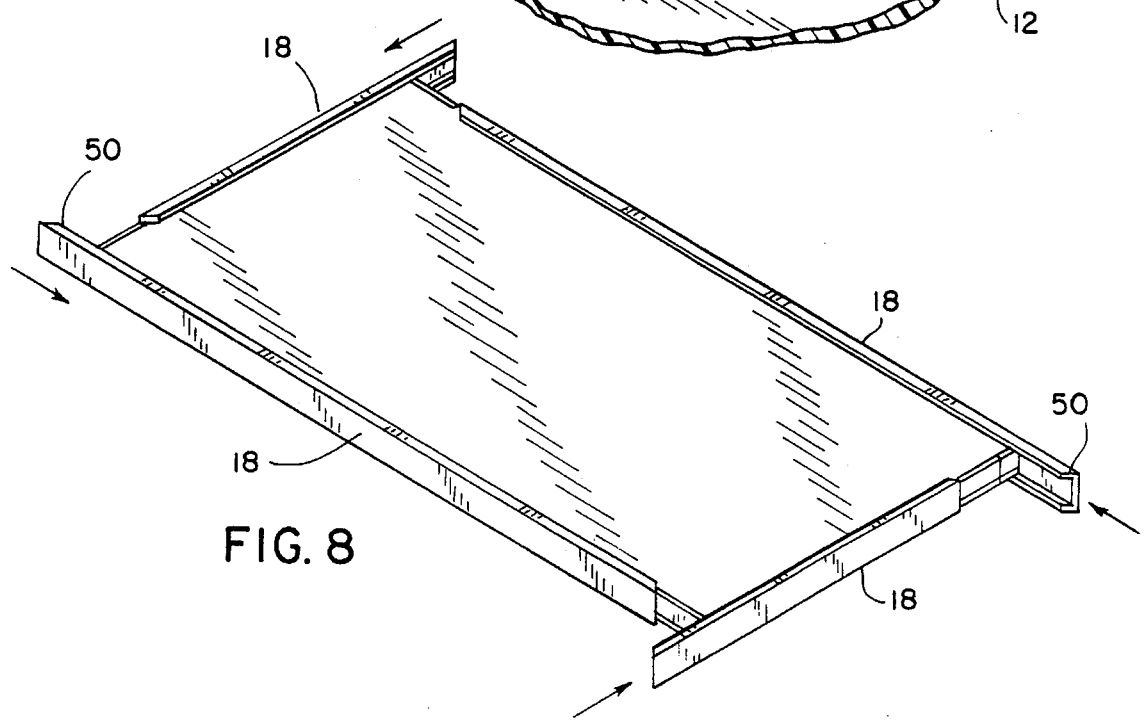
FIG. 8 schematically illustrates a door embodying the claimed invention in the process of being assembled.

Assembly of the door 10 is illustrated in FIGS. 8 and 9. A beam 18 is juxtaposed to a sheet end 20 so that the ridge 38 on the inner side 24 of the sheet 12 is opposite the space between the beam's flange 42 and hook post 46 and so that the flange 42 is adjacent the sheet ledge 36 and the hook 44 wraps around or embraces the sheet ledge 36. The beam 18 is then slidably fed along most of the length of the sheet edge 20. This is done on all four sides of the door 10 until each mitered beam end 50 is immediately adjacent another mitered beam end 50. Assembly is completed by serially exerting force, such as by tapping, on one or more of the mitered beam ends 50. It has been found that this procedure will cause the beams 18 to snap into a rigid frame in which the adjacent mitered beam ends 50 are held together by compression forces exerted by the interacting beams themselves.

In some applications, other means, such as fasteners of various types, may be employed to fasten one or more of the beam end pairs to each other. Also, in certain applications, it may be desirable to fasten one or more of the beams 18 to a sheet 12 by adhesive or by fasteners of various types.

Often panels, particularly doors and other insulating panels, will be provided with a core in the separation space. Frequently, this core is in the form of foam which is introduced into the separation space in a liquid state and allowed or encouraged to harden. This foam can be introduced after a panel has been assembled with a beam on each of its sides, as described above or done in other ways. The foam is then introduced through a port in one of the sheets or in the frame. In some applications and with some materials, the foam core will provide enough structural strength so that a frame member is not needed on every side of the panel. In such instances, permanent frame members can be provided at fewer than all of the sheet edges, using the beams and the method described above or other frame members and assembly methods. Temporary frame members are then temporarily fastened to the unframed edges of the panel to complete a fully enclosed separation space. The liquid foam is then introduced. After it hardens, the temporary frame members are removed and may be used again. This reduces the weight and cost of the assembled panel.

FIGS. 10(a) and 10(b) illustrate a type of temporary frame member 54. In the embodiment of those figures, the sheet edges intended to receive a temporary frame member 54 are provided with inwardly facing lips 56. These provide tracks to support the temporary frame member 54, which is an elongated plate with a finger hook 58 at one end. The temporary frame member 54 has a port 59 for allowing the introduction of foam in the liquid state. The port 59 is filled with a plug 61 until the foam has hardened. The temporary frame member 54 is slid along the tracks of the edges of the two sheets 12 until it forms a completed door edge 60. The finger hook 58 extends beyond the door edge 60. After the foam has been introduced and has hardened, the finger hook 58 facilitates removal of temporary frame member 54.

Particularly in making foam-core storm doors 10, which have a window, it has been found to be difficult to control the foam near the window opening 30. Liquid foam has a tendency to leak into the window frame 32 area and must be manually cleaned up. To control the foam in that area and thus reduce the extent of manual clean-up that is needed, it has been found advantageous to provide a rib 62 (FIGS. 3 and 7) projecting inwardly from the inner side 24 of one or both sheets 12. The rib 62 is dimensioned to reduce the cross-sectional flow area in the window frame 32 area. This reduces the flow rate and results in a lower density of foam beyond this partial barrier, which reduces the extent of the leakage into the window frame 32 area. It has been found advantageous to form opposing ribs 62 on the inner side 24 of both sheets 12 and to make the ribs 62 continuous all the way around the window frame 32 area. In the embodiment shown in the drawings, the separation space 26 has a width of 1.30 inches and each rib 62 has a height of 0.08 inches (except at the corners, as explained below), so that the height of flow area between the ribs 62 is 1.14 inches.

Figure 7:
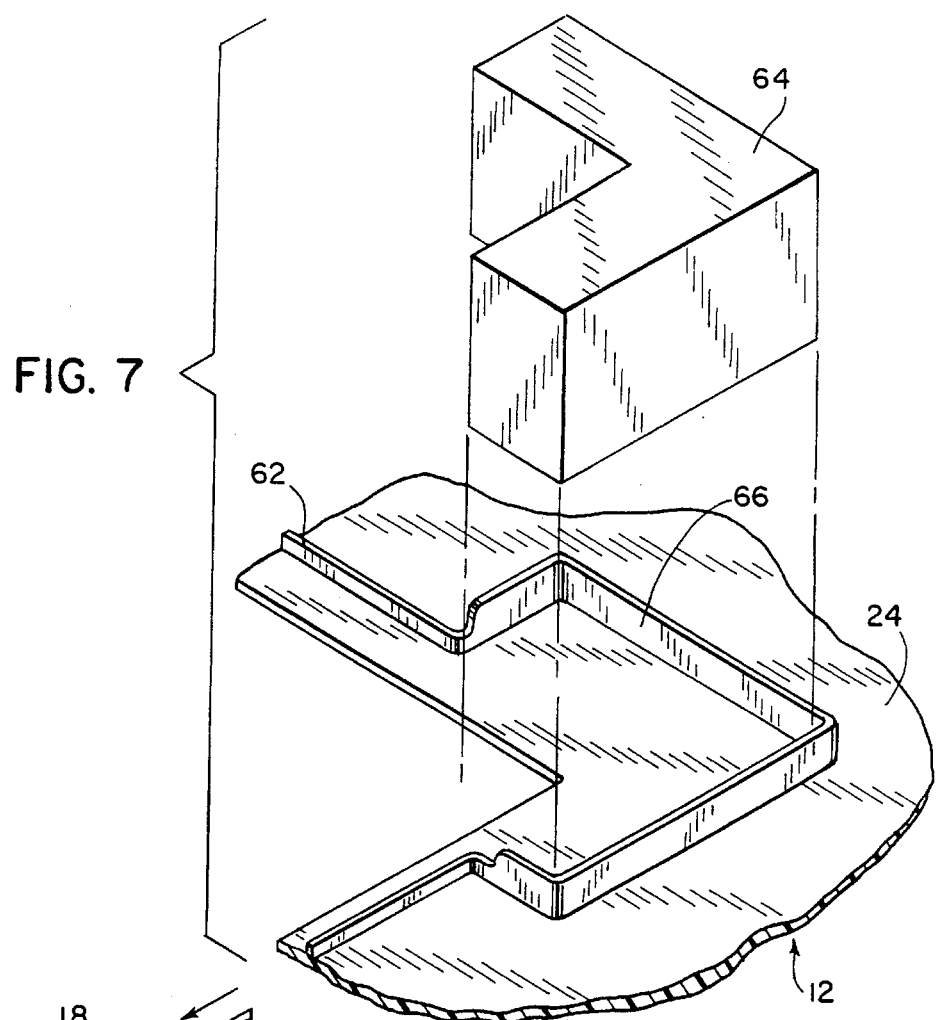
FIG. 7 is a perspective view illustrating a rib and a foam block used to control the flow of foam in the liquid state.

In a storm door, it has been found that flow control is especially critical at the corners of the window frame 32 area. It has been found advantageous to provide a resilient foam block 64 at each corner of the window frame 32 structure. As shown in FIGS. 3 and 7, the rib 62 described in the preceding paragraph is re-routed to accept an L-shaped, resilient foam block 64 which nestles between the re-routed portion 66 of the rib 62 and the window frame 32. The height of the re-routed portion 66 of the rib 62 is increased so that foam block 64 will remain in place during assembly. In the embodiment shown, the height of the rib 62 is 0.25 inches. The height of the foam block 64 is slightly greater than the thickness of the separation space 26 so that the foam block 64 is slightly compressed, thereby preventing the flow of foam over it. This keeps the liquid foam away from the critical corner areas of the window opening 30 during the filling process.

The sheets 12 may be compression molded sheet molding compound (SMC) panels or may be made of plastic of the thermoplastic or thermoset type and formed by injection molding, compression molding, blow molding or reaction injection molding or by vacuum forming or thermoforming. Other materials, including aluminum and steel, may be used as well. These may be roll-formed or extruded or formed by other techniques. Typically, when used in a storm door, the thickness of the sheets 12, if made of molded plastic, is in the range of 0.065 to 0.125 inches.

The beams 18 may be aluminum extrusions or may be made of other rigid materials by other processes.

The foam for the foam core may be a low density (e.g., 2 to 5 pounds per square foot), two-component, thermosetting, insulating polyurethane or an expanded polystyrene (EPS); other materials may be used as well.

Although the invention has been disclosed with specific embodiments, the invention claimed is not restricted to those embodiments. Rather, various changes and modifications may be made and other embodiments employed which are within the scope of the following claims.

We claim:

1. A structural panel comprising:
   (a) a pair of opposed, congruent sheets spaced apart by a frame which includes a beam located longitudinally along an edge of each of the sheets, each sheet having an outer side and an inner side facing the inner side of the other sheet, the sheets defining a separation space between them;
   (b) wherein the edge of each of the sheets has an inwardly projecting zig-zag defining a ledge on the outer side of the sheet and a ridge on the inner side of the sheet;
   (c) wherein along a longitudinal edge of the beam a flange extends from the beam, the flange having a connected leg which is an extension of said beam and is outward of said ledge and having a free leg overlying said ledge and, spaced apart from the flange, a hook projects from the beam into the separation space, the hook including a post projecting inwardly from the beam inward of said ledge and a cross member projecting outwardly from the post inward of said ridge toward the inner side of the sheet; and
   (d) wherein the sheet and the beam are adapted so that the ledge fits closely between the flange and the hook thereby establishing a mechanical engagement which restrains movement between the edge and the beam in two mutually orthogonal directions.

2. A structural panel according to claim 1, further comprising:
   (e) a foam core in the separation space, the foam core being hardened foam which was introduced into the separation space in a liquid state; and
   (f) a rib projecting inwardly from the inner side of at least one of the sheets so that the incoming liquid foam encounters a partial barrier which partially retards the flow of the liquid foam in a region of the separation space beyond the barrier beyond the barrier.

3. A structural panel according to claim 1, further comprising:
   (e) a foam core in the separation space, the foam core being hardened foam which was introduced into the separation space in a liquid state; and
   (f) a resilient foam block located in the separation space and in contact with the inner sides of both sheets, thereby substantially blocking the flow of the liquid foam in the region of the block.

4. A structural panel comprising:
   (a) a pair of opposed, congruent sheets spaced apart by a frame which includes a beam located longitudinally along an edge of each of the sheets, each sheet having an inner side facing the inner side of the other sheet, the sheets defining a separation space between them;
   (b) wherein from the edge of each of the sheets a flange and, spaced apart from the flange, a hook project inwardly, the hook including a post projecting from the sheet and a cross member projecting from the post toward the beam;
   (c) wherein the beam has an inward side facing the separation space and an opposite outward and wherein along a longitudinal edge of the beam there is a zig-zag projecting into the separation space and defining a ledge on the outward side of the beam and a ridge on the inward side of the beam; and
   (d) wherein the sheet and the beam are adapted so that the beam ledge fits closely between the sheet flange and the hook post, and the hook cross member embraces the beam ridge, thereby establishing a mechanical engagement between the sheet and the beam.

5. A method of manufacturing a structural panel, comprising the steps of:
   (a) providing a pair of congruent sheets, each sheet having an outer side, an inner side and a plurality of edges defining the shape of the sheet, at least one of the edges of each sheet having an inwardly projecting zig-zag which defines a ledge on the outer side of the sheet and a ridge on the inner side of the sheet;
   (b) providing at least one beam having along each of two of its opposed longitudinal edges a projecting flange and, spaced apart from the flange, a projecting hook, the hook including a post projecting from the beam and a member projecting transversely from the post;

(c) holding the two sheets in opposed, parallel congruent relationship;

(d) slidably feeding the beam along the said at least one edge of each sheet so that each sheet ledge fits closely between a beam flange and a beam hook post and so that each sheet ridge is embraced by a beam hook, thereby mechanically engaging the sheet edges to the beam's opposed longitudinal edges, the beam forming a side of the panel; and (e) providing other framing between the sheets along each sheet edge which is not attached by the steps (a) through (d).

6. A method of manufacturing a structural panel as in claim 5, comprising the further steps of:

(f) providing each beam with mitered ends;

(g) applying the steps (a) through (d) to all of the edges of the sheets and slidably feeding each of the beams to the point at which each mitered end is immediately adjacent to another mitered end; and (h) applying one or more short, light force impulses to one or more mitered ends until each mitered end is abutted tightly against another mitered end, thereby rendering the beams into a substantially rigid frame for the panel.

7. A method of manufacturing a structural panel, comprising the steps of:

(a) providing a pair of substantially planar, congruent sheets, each sheet having an inner side and a plurality of edges defining the shape of the sheet and the number of panel edges;

(b) providing a plurality of permanent frame members;

(c) holding the two sheets in opposed, parallel congruent relationship;

(d) fastening each permanent frame member between an edge of each of the sheets, thereby making a partial peripheral frame which forms fewer than all of the edges of the panel;

(e) providing one or more removable frame members, their number being equal to the number of panel edges not framed pursuant to steps (a) through (d);

(e) temporarily fastening a removable frame member to each unframed panel edge, whereby the sheets, the permanent frame members and the temporary frame members form a separation space between the sheets;

(f) introducing foam into the separation space in a liquid state through a port in a sheet, a permanent frame member or a temporary frame member;

(g) allowing or hastening the foam to solidify into a foam core; and (h) removing the temporary frame member or members.

* * * * *